United States Patent [19]
Daniels et al.

[11] Patent Number: 5,278,982
[45] Date of Patent: Jan. 11, 1994

[54] LOG ARCHIVE FILTERING METHOD FOR TRANSACTION-CONSISTENT FORWARD RECOVERY FROM CATASTROPHIC MEDIA FAILURES

[75] Inventors: Dean S. Daniels, Fremont, Calif.; Wayne A. Sawdon, Pittsburgh, Pa.; Roger L. Haskin, San Jose, Calif.

[73] Assignee: International Business Machines Corporation, Armonk, N.Y.

[21] Appl. No.: 813,233

[22] Filed: Dec. 23, 1991

[51] Int. Cl.$^5$ ............... G06F 15/00; G06F 15/40; G06F 7/22; G06F 11/08; G06F 12/00
[52] U.S. Cl. ............... 395/600; 364/DIG. 2; 364/282.1; 364/285.2; 395/700
[58] Field of Search ............... 395/700; 371/12; 364/974, 974.7, 282.1

Primary Examiner—Gareth D. Shaw
Assistant Examiner—Jon Hall Backenstose
Attorney, Agent, or Firm—Baker, Maxham, Jester & Meador

[57] ABSTRACT

A method for implementing transaction-consistent resource recovery from catastrophic media failures in a single pass over a recovery log archive while permitting most UNDO log records to be discarded during log archiving. The media recovery procedure is based on a pseudo-crash recovery technique that simulates a system crash at a selected time by writing PSEUDO-RECOVERY records to the recovery log. Resource recovery is then performed by normal execution of the log archive records up to the most recent pseudo-crash followed by execution of the subsequent PSEUDO-RECOVERY records. The recovery log record execution procedures are compatible with the ARIES recovery method. One embodiment of this invention assumes that the recovery log records can be selected for archiving on the basis of a combination of record type and transaction identifier.

9 Claims, 2 Drawing Sheets

LOG ARCHIVE FILTERING METHOD FOR TRANSACTION-CONSISTENT FORWARD RECOVERY FROM CATASTROPHIC MEDIA FAILURES

BACKGROUND OF THE INVENTION

1. Field of the Invention

This invention relates to a system for filtering recovery log archives to reduce the archive size while retaining all log records essential to transaction-consistent forward recovery solely from offline image dump and recovery log archive media.

2. Description of the Related Art

Recovery from secondary stable storage media failures is an important problem to computer systems. In some cases, media recovery must be done entirely from offline storage media (such as a tape archive). This is particularly necessary in small systems with a single disk stable store but may also be required to recover from larger system disasters such as machine room fires or natural disasters. Transaction-based systems such as database management systems require recovery of a data resource stored on stable media to an atomic or transaction-consistent state. Conventional data resource recovery algorithms are intended for crash recovery and assume that the entire recovery log is available, including that portion of the log conventionally stored on-line in stable storage media. Loss of the on-line recovery log through stable media failure will prevent transaction-consistent crash recovery. Forward recovery using conventional recovery algorithms requires the recovery log archive tape to include all recovery log records. This requirement for storing all log records is troublesome because of the substantial storage volume occupied by such a recovery log archive.

A conventional recovery system known in the art is described by C. Mohan, et al, "ARIES: A Transaction Recovery Method Supporting Fine-Granularity Locking and Partial Rollbacks Using Write-Ahead Logging," IBM Research Report RJ 6649, revised Nov. 2, 1990, IBM Research Division, Yorktown Heights, N.Y., which document is incorporated herein in its entirety by this reference.

As pointed out by C. J. Date, "An Introduction To DataBase Systems", Volume 1, 4th Edition, Addison-Wesley Publishing Co., Copyright 1986, Ch. 18, a "transaction" is a logical unit of work referencing a sequence of operations that transforms a consistent state of a recoverable resource into another consistent state without necessarily preserving consistency at all intermediate points in the sequence. For purposes of this discussion, a database is referenced as a typical instance of a recoverable resource.

Database management systems that maintain data in stable storage are subject to failures that leave the data in a corrupted or inconsistent state. Inconsistent data can violate integrity guarantees assumed by users and extreme cases can cause a database management system to operate improperly or crash. The database can be recovered from crashes by scanning the recovery log to determine which transactions have committed and which have aborted, using UNDO recovery log records to back out the actions of aborted transactions and using REDO recovery log records to repeat the actions of committed transactions that may not have been written to permanent storage before the crash. To recover from stable storage media failure, the archival dump of database and recovery log must be similarly processed.

A system supporting transaction processing guarantees that if a transaction executes some updates against the database and a system failure occurs before the transaction reaches its normal termination, then those updates will be undone as part of a recovery procedure. Consequently, the transaction either executes in its entirety or it is totally cancelled. Guaranteeing the atomicity and durability of transactions in the face of concurrent execution of multiple transactions and unpredictable failures is a very important problem in transaction processing. Many methods have been developed in the past to deal with this problem, but the related assumptions, performance, characteristics and complexity associated with such methods have not always been acceptable.

To meet transaction and data recovery guarantees, the transaction recovery system records in a recovery log the progress of a transaction and its actions that cause changes to recoverable data objects. The recovery log becomes the source for ensuring that either the transaction's committed actions are reflected in the database or its uncommitted (aborted) actions are undone despite various types of failures. When the logged actions reflect data object content, then those recovery log records also become the source for reconstruction of damaged or lost data. Conceptually, the recovery log can be considered as an ever-growing sequential file. Every log record is assigned a unique log sequence number (LSN) when that record is appended to the log. The LSNs are assigned in ascending sequence and are typically the logical addresses of the corresponding log records, or timestamps which measure elapsed time from some beginning point.

The non-volatile or stable version of the recovery log is stored on stable storage such as rotating magnetic media ("disk"). Such stable storage can be improved by maintaining two identical copies of the recovery log on different disks. These on-line stable storage log records are then occasionally copied to a cheaper and slower archive medium such as tape. The recovery log archive records may be discarded once the appropriate image copy (archive dumps) of the database is produced, making the earlier recovery log archive records moot.

When a transaction or process failure occurs, the transaction is typically in such a state that its updates must be undone. It is possible that the transaction has corrupted some pages in volatile storage if it was involved in performing updates when the process disappeared. When a system failure occurs, the volatile storage contents are usually lost and the transaction system must be restarted and recovery performed using the stable storage versions of the database and recovery log. When a stable storage media or device failure occurs, the contents of the stable storage media are usually lost and the database must be recovered using the most recent image copy (archive dump) of the data object and the recovery log archive.

The UNDO records of a recovery log provide information on how to undo changes performed by the transaction. The REDO records of a recovery log provide information on how to redo changes performed by the transaction. In Write-Ahead Logging (WAL) based systems such as ARIES, an updated database is written back to the same stable storage location from where it was read. The WAL protocol asserts that the recovery log records representing changes to some data must already be in stable storage before the changed data are allowed to replace the previous version of those data in stable storage. That is, the system is not permitted to write an updated data page to the stable storage version of the database until at least the UNDO records of the recovery log describing the page update actions have been first written to stable storage.

Since a transaction includes execution of an application-specified sequence of operations, it is initiated with a special BEGIN transaction operation and terminates with either a COMMIT operation or an ABORT operation. The COMMIT and ABORT operations are the key to providing atomicity, as is known in the art. Transaction status is also stored in the recovery log and no transaction can be considered complete until its COMMIT status and all of its recovery log records are safely recorded on stable storage by forcing to disk all recovery log records up through the LSN of the most recent transaction COMMIT record. This permits a restart recovery procedure to recover any transactions that completed successfully but whose updated pages were not physically written to stable storage before system failure. This means that a transaction is not permitted to complete its COMMIT processing until all REDO records for that transaction have been written to stable storage.

For systems with large amounts of data, image dumps to archival media may only be taken infrequently. The number of recovery log records that must be applied to recover forward of an image dump grows with time and eventually become quite large. The recovery log archive itself may grow so large as to require inconvenient amounts of offline log archive storage. The size of the log archive, and consequently the media recovery time, can be reduced by compressing (filtering) extraneous data from the log records during the log archiving process. In particular, as is well-known, the UNDO data can be discarded from the recovery log archive if it is reliably assumed that the on-line stable store portion of the recovery log will be available for recovery.

For the case of a catastrophic media failure in which the system must be completely restored from offline storage, this on-line recovery assumption is unacceptable. Clearly, even if all UNDO records are present in the log archive, the database can only be restored up to the most recently written log archive record. However, it is better to recover to a transaction-consistent state while losing some recent transactions than to recover to an inconsistent and possibly corrupt state that may itself cause the database system to crash. The fundamental problem in the art is that if the UNDO records are discarded during log archiving, it is not generally possible to recover the data object in a transaction-consistent state from archives alone. This is because the usual corrupt data object image dump is not archived in a transaction-consistent state and cannot be brought into a consistent state without performing UNDO operations for the transactions that were active at the time of the image dump.

The recovery of such an archived image dump is referred to as forward recovery. Forward recovery is similar, but not identical, to crash recovery, which is the process of recovering a data resource to a transaction-consistent state after a system crash by applying the recovery log to the data resource itself as it existed at the time of the crash. The "crashed resource" is also generally in a corrupt state at the time of crash and must be purged of incomplete transactions through the use of the on-line recovery log records. One difference is that the amount of recovery log that must be processed during crash recovery can be minimized by making frequent checkpoints during normal forward processing, whereas the amount of recovery log that must be processed during forward recovery from archives can be very large, motivating the log filtering schemes mentioned above.

Transaction-consistent forward recovery from a damaged recovery log is accomplished by applying to an image dump resource copy the recovery log records starting with the record corresponding to the time of the image dump and processing forward to some record before but in the vicinity of the earliest damaged log portion. If the recovery log archive has been filtered of all UNDO records, the incomplete transactions cannot be backed out, preventing transaction-consistent recovery from archived records alone.

For this reason, the extensive related data object recovery art uses unfiltered recovery logs. Such art is ineffective for resolving the forward recovery archive filtering problem. Refer to U.S. Pat. No. 4,648,031 issued to Jenner, U.S. Pat. No. 4,507,751 issued to Gawlick, et al, and U.S. Pat. No. 4,945,474 issued to Elliott, et al. These practitioners disclose various techniques for compressing the recovery log and for efficient application of a recovery log to the corrupt data object but none address the problem of forward recovery from filtered log archives.

In U.S. Pat. No. 4,878,167, Kapulka, et al describe a method for constructing a filtered "resource recovery" log for accomplishing forward recovery. Kapulka, et al describe a method for constructing a filtered log that supports forward recovery from an undamaged log but their filtered resource recovery log does no contain sufficient information to permit transaction-consistent recovery at any point from a damaged log.

Thus, a problem felt in the art is the need for an efficient recovery log archiving protocol that will guarantee transaction-consistent recovery from data resource image dump and recovery log archives alone without archiving every UNDO log record for the entire database system. This unresolved problem is clearly felt in the art and is solved by the present invention in the manner described below.

SUMMARY OF THE INVENTION

The present invention is a method for implementing transaction-consistent recovery from a catastrophic stable store failure with only one pass over the recovery log archive, while still allowing most UNDO data to be filtered and discarded during the log archiving process. The definition of a catastrophic failure implies that some arbitrary number of completed transactions will remain lost after resource recovery to consistency. However, the method of this invention permits an unexpectedly flexible compromise between the recovery log archive storage volume and completeness of atomic recovery.

The present invention includes three alternate embodiments for filtering and recovery from catastrophic stable media failures. These are (a) a one-pass recovery method, (b) a one+epsilon pass recovery method and (c) an extent-oriented one+epsilon pass recovery method.

The first two methods are based on the notion of "pseudo-crash" recovery, which forms a basis of this invention. A pseudo-crash (P/C) is defined as a simulated system crash occurring at a particular point in time, referred to as the pseudo-crash point. At the pseudo-crash point, the transaction records that would be written by the existing crash-recovery system are written to the recovery log with special pseudo-crash identification. Normal system operation and recovery log creation continues as the PSEUDO-RECOVERY type records are written in the background. After a catastrophic failure, data resource recovery is performed from the recovery log archive in the usual manner up to the point of the most recent pseudo-crash (according to a Log Archive Descriptor (LAD) that contains the MOST-RECENT-PSEUDO-CRASH timestamp) and the PSEUDO-RECOVERY records are then applied to recover the consistent resource. After application of the PSEUDO-RECOVERY records, the data resource will be in a transaction-consistent state.

The third method of this invention uses a log extent concept that ensures complete recoverability within variable extents of the log archive. The extent-oriented one+epsilon pass recovery method is applicable to systems where log records can be selected for archiving on the basis of a combination of record type and transaction identifier. All three methods also require the archival storage of a small Log Archive Descriptor (LAD) block describing the state of the off-line log archive.

It is an object of this invention to reduce the volume of the recovery log archive by filtering non-essential records from the archive while keeping all records necessary to a transaction-consistent forward recovery. It is an advantage of this invention that the system overhead associated with the repeated creation of PSEUDO-RECOVERY records is small enough to allow enough frequency so that the number of restorable transactions approximates the number available when all recovery log records are retained in the recovery archive. That is, the catastrophic transaction losses are no worse with the pseudo-crash procedure than expected with an unfiltered log archive. It is another advantage of this invention that the recovery system employing the methods of this invention can balance the pseudo-crash overhead requirement against the recovery completeness requirement.

The methods of this invention are consistent with the ARIES recovery algorithm disclosed in the reference cited and incorporated above, although they are also applicable to other WAL recovery techniques that use UNDO-REDO procedures. These methods are applicable to systems that assign arbitrary types to recovery log records, that can instruct the recovery log system to copy or discard log records based on the record type when copying log records to the log archive, and that can recover the log record type during a scan of the recovery log archive.

The foregoing, together with other features and advantages of the present invention, will become more apparent when referring to the following specifications, claims and the accompanying drawings.

BRIEF DESCRIPTION OF THE DRAWINGS

For a more complete understanding of the present invention, we now refer to the following detailed description of the embodiments illustrated in the accompanying drawings, wherein:

FIG. 3, comprising FIGS. 3A and 3B, illustrates the one-pass recovery method of the present invention;

FIG. 5, comprising

DESCRIPTION OF THE PREFERRED EMBODIMENTS

Figure 1:
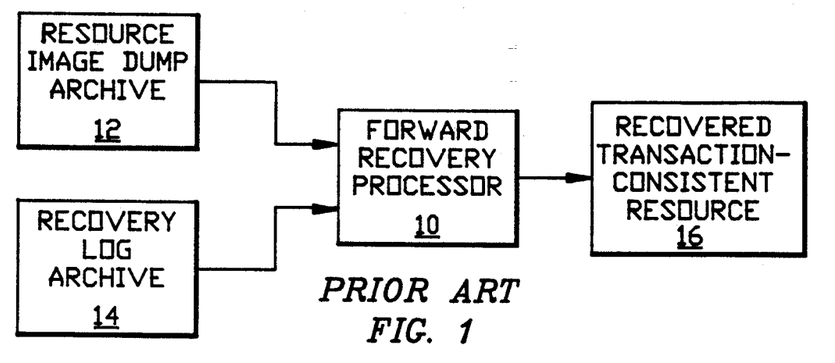
FIG. 1 illustrates the forward data resource recovery process known in the prior art.

The WAL transaction recovery method described herein to illustrate the operation of this invention can be best understood with reference to the above-cited report by Mohan, et al entitled "ARIES: A Transaction Recovery Method Supporting Fine-Granularity Locking and Partial Roll-Backs Using Write-Ahead Logging". FIG. 1 illustrates the forward-recovery process known in the prior art. A forward recovery processor 10 employing a suitable resource recovery procedure, such as ARIES, is shown accepting a resource image dump archive 12. A recovery log archive 14 provides a series of recovery records, including REDO and UNDO types, which are applied by processor 10 to image dump archive 12 in a serial manner to eventually produce a recovered transaction-consistent resource 16, which can include, for example, a database. Resource 16 will then be made available for continued system operation following catastrophic failure and, because resource 16 is in a transaction-consistent state, future system operation will be unhindered except for the loss of whatever transactions had occurred following the most recent recovery log archiving step. In the prior art, log archive 14 must include an unfiltered copy of all log records.

Figure 2:
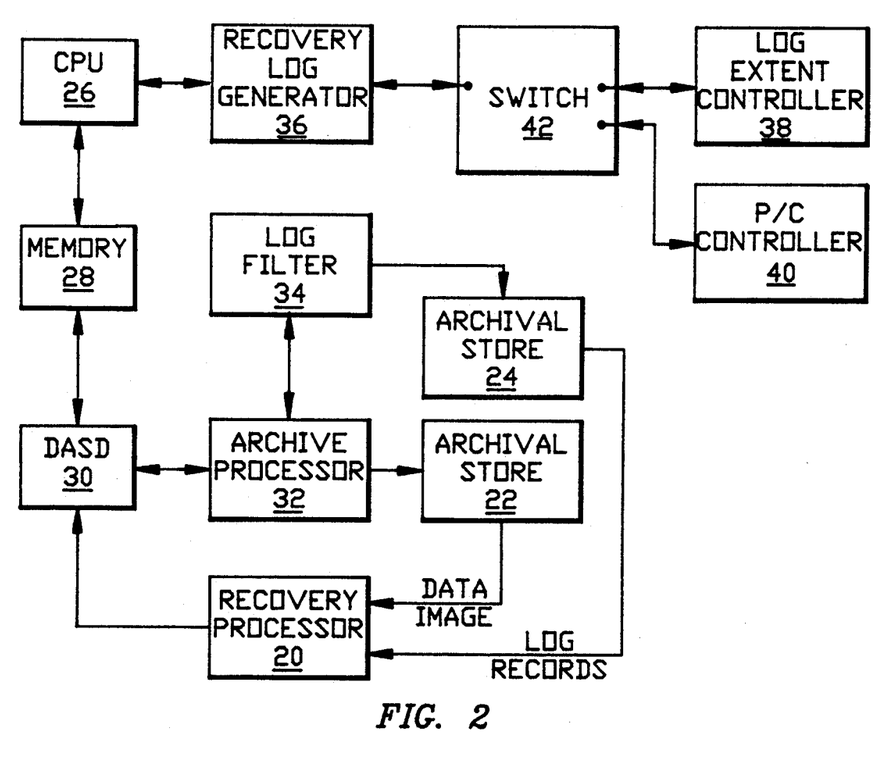
FIG. 2 illustrates an embodiment of the transaction-oriented system of the present invention.

FIG. 2 shows an exemplary embodiment of a transaction-oriented system incorporating the present invention. The recovery processor 20 and the archival stores 22 and 24 are directly analogous to processor 10 and archives 12 and 14 discussed in connection with FIG. 1. A central processing unit (CPU) 26 operates to control the entire transaction-oriented system. A primary memory 28 is connected by a two-way communications bus to CPU 26 and a Direct Access Storage Device (DASD) 30 is connected through a bi-directional data bus to memory 28. DASD 30 provides the high capacity stable store required to store the entire online data object and online recovery log.

An archive processor 32 is connected through a bi-directional databus to DASD 30. Archive processor 32 accepts both data object images and recovery log records from DASD 30, splitting off the log records which proceed through a log filter 34 and therefrom to archival store 24. Archive processor 32 accepts a data object image from DASD 30 and writes it directly into archival store 22 in any suitable manner known in the art for a resource image dump. Log filter 34 serves to filter unwanted log records from the recovery log before writing the remaining recovery log records to archival store 24.

A recovery log generator 36 is connected through a bi-directional databus to CPU 26, thereby creating a log record in response to every action taken relating to the data resource stored in memory 28 and DASD 30. Recovery log generator 36 includes all of the crash recovery procedures (e.g., ARIES) necessary to ensure transaction-consistent recovery from failures of memory 28 or CPU 26. The operation of generator 36 is modified by either a log extent controller 38 or a pseudo-crash controller 40. Controllers 38 and 40 are shown in FIG. 2 as being connected to generator 36 through a switch 42 for illustrative purposes only. In preferred practice, either controller 38 or controller 40 would be solely implemented within recovery log generator 36.

In the event of a catastrophic failure of DASD 30, recovery processor 20 serves to accept a resource image dump copy from archival store 22 and a recovery log archive copy from archival store 24, whereby a new transaction-consistent data resource is produced and forwarded to DASD 30 in the manner discussed above in connection with FIG. 1. Recovery processor 20 together with log filter 34 and controllers 38–40 are essential elements of this invention as applied to the transaction-oriented system illustrated in FIG. 2.

Three alternate methods for forward recovery from a filtered log archive are described herein as part of this invention. Each of the three methods consist of three separate procedures. These three procedures are (a) the forward processing logging procedure, (b) the log archive filtering procedure, and (c) the catastrophic forward recovery procedure. PASCAL-type pseudocode embodiments of these three procedures are illustrated in Tables 1–8 for the three methods of the present invention according to the following list.

| Table | Method | Procedure |
|---|---|---|
| 1 | One Pass | Forward Logging |
| 2 | One Pass | Log Archive Filtering |
| 3 | One Pass | Forward Recovery |
| 4 | One + Epsilon | Forward Logging |
| 2 | One + Epsilon | Log Archive Filtering |
| 5 | One + Epsilon | Forward Recovery |
| 6 | Extent-Oriented | Forward Logging |
| 7 | Extent-Oriented | Log Archive Filtering |
| 8 | Extent-Oriented | Forward Recovery |

Figure 3A:
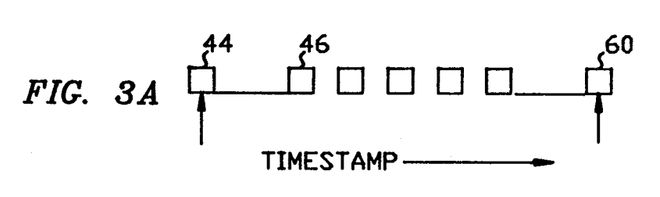

The one-pass recovery method recovers to the most recent pseudo-crash (P/C) point available in the log archive, making only one forward pass over the archive. Referring to Table 1 and FIG. 3B, the data management method begins by establishing a P/C point. This is done by writing a START-PSEUDO-CRASH type log record containing a unique pseudo-crash timestamp 44 (FIG. 3A). A pseudo-abort is next performed for each active transaction by writing a series of PSEUDO-RECOVERY type records into the log as exemplified by record 46 in FIG. 3A. The special type codes (e.g.: PSEUDO-RECOVERY type) distinguish them from real recovery records. PSEUDO-RECOVERY records 46 are the same as those which would have been written by crash recovery processor 20 if the system had crashed at the P/C point. PSEUDO-RECOVERY records 46 correspond to the ARIES compensation records that are written during a transaction abort. When all PSEUDO-RECOVERY records 46 have written, an END-PSEUDO-RECOVERY record 48 (FIG. 3A) containing the P/C point timestamp is written to the log.

Figure 3B:
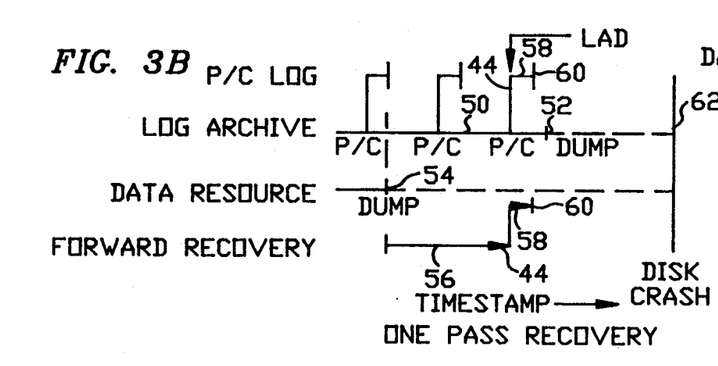

Referring to FIG. 3B, notice that the recovery log proceeds from P/C point to P/C point along solid line 50 until the last log archive dump (LAD) 52. Thereafter, the log continues to accumulate in stable storage (dotted line at 52) but is not present in the log archive. Pseudo-crashes exemplified by P/C point 44 occur at intervals along recovery log line 50. At each P/C, a series 58 of PSEUDO-RECOVERY type records are written followed by an END-PSEUDO-RECOVERY type record 60, shown as short line (P/C log) segments in FIG. 3B. The most recent of these segments is labeled LAD, which indicates that a Log Archive Descriptor representing the most recent P/C point 44 has been written to the log archive. An important feature to note in FIG. 3B is that recovery log creation proceeds simultaneously with the pseudo-crash recovery log generation. In practice, the two sets (50 and 58) of log records are merged together in a single recovery log. Record series 50 and 58 are shown on separate lines in FIG. 3B for illustrative purposes only.

The second procedure for the one-pass recovery method is the log archive filtering procedure illustrated as pseudocode in Table 2. When copying records from the on-line log in DASD 30 (FIG. 2) to the log archive in archival store 24, all UNDO records are discarded and all other record types, including all PSEUDO-RECOVERY types, are copied to the log archive. The timestamp of the most recently copied END-PSEUDO-RECOVERY type record 60 (which equals the P/C timestamp of record 44) is stored in the log archive LAD when the archive tape is completed. In FIG. 3B, the log archive dump point 52 is illustrated in relationship with the most recent data resource image dump point 54 that demonstrates that the log archive dump point must occur after the image data dump point.

The third procedure for the one-pass recovery method is the forward media recovery procedure illustrated as PASCAL-type pseudocode in Table 3. First, the image dump data is restored from archival store 22 (FIG. 2). Next, the most recent P/C timestamp is obtained from the archive LAD. Then, the log archive is scanned and the log records are applied to the data resource. The forward recovery scan is illustrated in FIG. 3B as line 56. Note that the scan begins at image dump point 54 and proceeds forward until the most recent P/C labeled LAD. All PSEUDO-RECOVERY type records for pseudo-crashes other than the most recent are ignored during this scan. When the most recent pseudo-crash record 44 is encountered, the PSEUDO-RECOVERY records 58 are applied to the data resource and real compensation log records are written. All other recovery log records on line 50 following the most recent pseudo-crash timestamp 44 are ignored, as will be appreciated by noting the termination point of forward pass 56 in FIG. 3B. Recovery is complete upon reading the END-PSEUDO-RECOVERY record 60 at the end of line 58.

Thus, in a single forward pass over the log archive from image dump point 54 to most recent END-PSEUDO-RECOVERY record 60, the data resource image dump archive has been recovered to a transaction-consistent state for all transactions preceding the most recent P/C point 44 stored in the Log Archive Descriptor. Note that in the example shown in FIG. 3B, all transactions subsequent to the LAD timestamp 44 up until the disk crash point 62 are lost. However, this transaction loss interval is no worse than the loss interval incurred with a forward recovery using an unfiltered recovery log archive made at the same time. In this example, the log filtered archive contains no UNDO type records and only the few additional pseudo-crash log records illustrated.

The one pass recovery method allows recovery in a single log archive pass at the cost of writing the extra START-PSEUDO-CRASH, PSEUDO-RECOVERY and END-PSEUDO-RECOVERY log records. Some or all of the PSEUDO-RECOVERY type records can be eliminated from the log archive by using the second method of this invention, which is the one+epsilon pass recovery method. This second method reduces or eliminates PSEUDO-RECOVERY type records at the expense of requiring a partial bounded reverse pass over a small portion (epsilon) of the log archive to undo some transactions. This second method again includes three procedures.

The first forward processing procedure is illustrated in Table 4 in PASCAL-type pseudocode. The second log archive procedure is substantially identical to that illustrated for the first method in Table 2. Finally, the forward recovery procedure is illustrated in Table 5.

Figure 4:
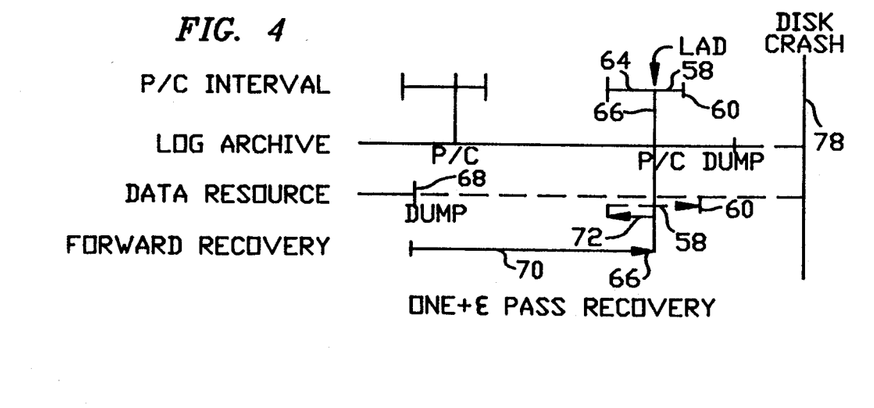
FIG. 4, illustrates the one+epsilon pass recovery method of the present invention.

Referring to Table 4 and FIG. 4, it will be appreciated that the one+epsilon pass recovery method first involves preparation for a pseudo-crash by initiating a pseudo-crash interval, during which recovery log records containing undo data are written with special type codes (e.g.: PRE-PSEUDO-CRASH-INTERVAL-UNDO type) to distinguish them from the normal UNDO record type. The pseudo-crash interval 64 (FIG. 4) extends for a period of time to allow all or most of the transactions active at the start of the pseudo-crash interval to complete. The length of the pseudo-crash interval period is a tuning parameter and, for a particular system, might be the two-sigma bound on expected execution time of all transactions.

At the end of pseudo-crash interval 64, the P/C is established and a START-PSEUDO-CRASH type record is written as in the first method discussed above. PSEUDO-RECOVERY records are then written for any active transactions that began ahead of the pseudo-crash interval and have not yet completed. Because these longer active transactions will be substantially fewer than the active transactions necessitating PSEUDO-RECOVERY records in the one-pass recovery method above, the total number of PSEUDO-RECOVERY type log records is greatly reduced in this second method. Finally, the END-PSEUDO-RECOVERY record 60 (FIGS. 3B and 4) is written to the recovery log as before.

The second procedure in this one+epsilon pass recovery method is the log archive filtering procedure. During log archiving, all UNDO records created outside of the pseudo-crash interval are discarded and all other record types, including PRE-PSEUDO-CRASH-INTERVAL-UNDO and PSEUDO-RECOVERY types, are copied to the log archive. The timestamp of the most recently archived P/C is recorded in the LAD as discussed before in connection with the one-pass recovery method. This procedure is identical to the procedure shown in Table 2 for the one-pass recovery method.

Referring to FIG. 4, note that the PRE-PSEUDO-CRASH-INTERVAL-UNDO records along line 64 are included in the log archive together with the PSEUDO-RECOVERY records between P/C point 66 and the END-PSEUDO-RECOVERY record 60. Although illustrated as two separate record series in FIG. 4, both the PRE-PSEUDO-CRASH-INTERVAL-UNDO records and the other log records are in practice integrated into a single recovery log and are separable only by reference to a record type designator.

The third procedure in the one+epsilon pass recovery method is the forward recovery procedure illustrated in PASCAL-type pseudocode in Table 5. As above, the forward media recovery is performed using the normal log archive records during a forward pass 70 from the image dump point 68 until the most recent P/C point 66 (FIG. 4). After reading the most recent START-PSEUDO-CRASH record, the forward pass continues as pass 58 in FIG. 4, but applies only PSEUDO-RECOVERY records until the END-PSEUDO-RECOVERY record 60 is encountered. After reading the most recent END-PSEUDO-RECOVERY record 60, the transactions active at the time of the latest P/C point 66 are undone by making a normal reverse recovery pass 72 to apply the PRE-PSEUDO-CRASH-INTERVAL-UNDO records to undo the effects of transactions that were active at P/C point 66 but not undone by forward pass 70 and pass 58. Pass 58 has already completed the undoing of any long transactions whose executions spanned the entire pseudo-crash interval 54.

Thus, as before, the data resource image dump 68 is recovered to a transaction-consistent state for transactions through the most recent P/C point 66. All transactions subsequent to P/C point 66 through the disk crash point 78 are lost. By requiring the second short reverse pass 72, most PSEUDO-RECOVERY type records as well as all UNDO records can be filtered from the log archive.

The above two methods require special recovery logic, illustrated in FIG. 2 as pseudo-crash controller 40, which writes PSEUDO-RECOVERY type records to the recovery log during normal forward processing. The third method of this invention is the extent-oriented one+epsilon pass recovery method, which exploits quantization in the recovery log archiving process to eliminate all such extra PSEUDO-RECOVERY type log records at the expense of some additional bookkeeping during the forward processing procedure. This third method also requires more complex filtering logic (illustrated as log filter 34 in FIG. 2) to filter the UNDO records from the log archive when compared with the first two pseudo-crash methods. The extent-oriented method assumes that the recovery log is written in quanta (log extents) and that the log archiving process operates on completely-written extents. Transaction-consistent recovery can be accomplished as of the end of any extent in the log archive. The method places no restriction on the size the log archive extent.

Figure 5A:
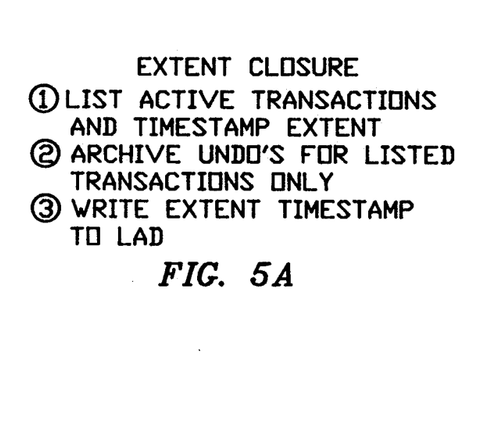
FIGS. 5A and 5B, illustrates the extent-oriented one+epsilon pass recovery method of the present invention.
Figure 5B:
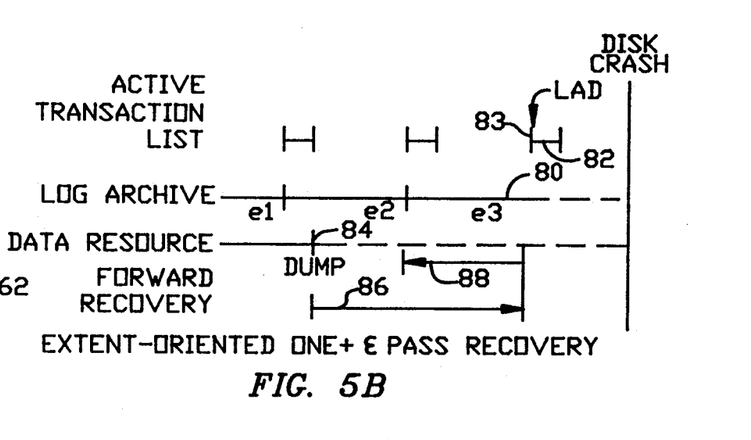

The first forward processing procedure for the extent-oriented recovery method is illustrated in Table 6 in the form of a PASCAL-type pseudocode implementation. Referring to FIG. 5B, during normal forward processing, the data management system begins a new extent by writing new recovery log records to the extent until it is full. The extents, which may be of different lengths, are illustrated along line 80 as e1, e2 and e3. When an extent is full, the data management system writes an EXTENT-ID record to "close" the extent (FIG. 5A) and associates a list of currently active transactions with the extent. Such a list is illustrated in FIG. 5B as line 82. This active transaction list can be written as a checkpoint record listing such active transactions as the last record in the extent or by writing the active transaction list into the EXTENT-ID record.

The second procedure in this extent-oriented method is the log archive filtering procedure illustrated in Table 7 as of a pseudocode routine. Log archiving proceeds one extent at a time. When extent archiving begins, the list 82 of active transactions is obtained from the end of the extent. All records for extent transactions on active list 82 are then copied to the archive, but UNDO records for transactions that are not on the list 82 are discarded. These are typically the great majority of the UNDO records, depending on the length of the log extent. When the archive tape is dismounted, the EXTENT-ID record 83 for the most recent archived extent is written into the LAD for that particular archive tape.

The third procedure for the extent-oriented method is the forward recovery procedure illustrated in Table 8. Referring to FIG. 5B, the permanent data resource image dump taken at 84 is first restored. Next, the most recent archived EXTENT-ID record 83 timestamp is obtained from the Log Archive Descriptor. Then, the log archive is scanned forward from the time of image dump 84 through the most recent LAD 83 timestamp and the data resource is conventionally updated in accordance with the recovery log records. The usual roll-forward media recovery processing (e.g., ARIES) is used except that the roll-forward pass ceases when the last record 83 in the most recently archived extent has been processed. This pass is illustrated in FIG. 5B as line 86.

Finally, the UNDO records in the most recent extent are used to undo the effects of the active transactions in list 82. This second short reverse-pass (over extent e3 to execute UNDO records) is illustrated as line 88 in FIG. 5B.

The discussion herein assumes that the recovery log include records of the UNDO and REDO types. In practice, it is common for both UNDO and REDO data to be included in a single recovery log record. In such cases, the above discussion is intended to refer to the REDO and UNDO portions of such recovery log records.

Clearly, other embodiments and modifications of the present invention will occur readily to those of ordinary skill in the art in view of these teachings. Therefore, this invention is to be limited only by the following claims, which include all such embodiments and modifications.

TABLE 1

```
ForwardProcessing ()
BEGIN
    /* Generate unique timestamp */
    timeStamp = GenerateUniqueTimeStamp ();
    /* Write START-PSEUDO-CRASH record */
    LogWrite ("START-PSEUDO-CRASH", timeStamp);
    /* Perform a pseudo-abort for each active transaction */
    FOR EACH ACTIVE TRANSACTION DO
        /* Perform a pseudo-abort on the transaction
         * Normally, this routine would abort the transaction
         * by writing "RECOVERY" records into the log and
undoing
         * the effects of the transaction on volatile data
         * structures. But when called with the "DoPseudoAbort"
         * flag, the routine writes "PSEUDO-RECOVERY" records
into
         * the log and does not change the volatile data
         * structures.
         */
        AbortTransaction (transaction, DoPseudoAbort);
    END
    /* Write an END-PSEUDO-RECOVERY record */
    LogWrite ("END-PSEUDO-RECOVERY", timeStamp);
END
```

TABLE 2

```
Archiving ()
BEGIN
    /* Process each record as it is copied to the offline
```

TABLE 2-continued

```
     * archive */
    FOR EACH RECORD DO
        SELECT (logrecord.type)
            WHEN ("RECOVERY") DO
                /* Records used to undo transactions are not
                 * required for media recovery. They are not copied
                 * to the archive.
                 */
                DiscardRecord (logrecord);
            END
            WHEN ("END-PSEUDO-RECOVERY") DO
                /* Remember the highest pseudo-crash timestamp
                 * The record is copied to the archive and forced to
                 * non-volatile storage along with all records
                 * previously written to the archive.
                 */
                timeStamp = logrecord.timestamp;
                LogWriteArchive (logrecord);
                LogForceArchive ();
                SavePseudoCrashTimeStamp (timeStamp);
            END
            OTHERWISE DO
                /* All other records are simply copied to the
                 * archive. The records will be forced to
                 * non-volatile storage when the END-PSEUDO-
                 * RECOVERY record is copied.
                 */
                LogWriteArchive (logrecord);
            END
        END SELECT
    END
END
```

TABLE 3

```
/*
 * Input to this routine is the timestamp of the most
 * recent END-PSEUDO-RECOVERY record successfully
 * written to the archive.
 */
CatastrophicMediaRecovery (MostRecentPseudoCrashTime
                           Stamp)
BEGIN
    /* Initialize local variable used to determine
     * if PSEUDO-RECOVERY records should be applied. Only
     * the PSEUDO-RECOVERY records from the last successful
     * pseudo-crash will be applied.
     */
    ApplyPseudoCrashRecords = FALSE;
    /* Read and process each record in the archive
     * One pass is made over the archive, starting with the
     * oldest record and reading toward the most recently
     * written record.
     */
    FOR EACH RECORD IN THE ARCHIVE DO
        SELECT (logrecord.type)
            WHEN ("START-PSEUDO-CRASH") DO
                /* Check if the timestamp on this record matches the
                 * input timestamp. If so, this is the most recent
                 * pseudo-crash and its PSEUDO-RECOVERY records
                 * should be applied.
                 */
                IF (logrecord.timestamp = MostRecentPseudoCrashTime
                                          Stamp)
                    THEN ApplyPseudoCrashRecords = TRUE;
            END
            WHEN ("END-PSEUDO-RECOVERY") DO
                /* If we are currently applying PSEUDO-RECOVERY
                 * records, then this record indicates that media
                 * recovery is complete. All transactions that
                 * were active at the START-PSEUDO-CRASH have been
                 * aborted and their effects undone. Transactions
                 * which started after the START-PSEUDO-CRASH were
                 * ignored and their changes not applied. The data
                 * has been restored to a transaction-consistent
                 * state at the point of the START-PSEUDO-CRASH.
                 *
                 * Return success to the caller to indicate the data
                 * has been restored to a transaction-consistent
                 * state.
                 */
```

TABLE 3-continued

```
        IF (ApplyPseudoCrashRecords = TRUE)
            THEN RETURN (SUCCESS);
        END
        WHEN ("PSEUDO-RECOVERY") DO
            /* If we are processing the most recent pseudo-crash,
             * then the record should be applied. Otherwise the
             * record is ignored.
             */
            IF (ApplyPseudoCrashRecords = TRUE)
                THEN ApplyRecord (logrecord);
            END
            OTHERWISE DO
                /* All other records are applied only if we are NOT
                 * processing the most recent pseudo-crash. Other-
                 * wise they are ignored.
                 */
                if (ApplyPseudoCrashRecords = FALSE)
                    THEN ApplyRecord (logrecord);
            END
        END SELECT
    END
    /* If the END-PSEUDO-RECOVERY record for the specified
     * timestamp was not found in the archive, return an error
     * to the caller to indicate the data was not restored to
     * a transaction-consistent state.
     */
    RETURN (FAILURE);
END
```

TABLE 4

```
Forward Processing ()
BEGIN
    /* Save the LSN of the last record written before the
     * start of the pseudo-crash interval.
     */
    PreIntervalHighLSN = LogCurrentHighestLsn ();
    /* Start pseudo-crash interval timer.
     * The timer period is a tuning parameter. The longer the
     * period the fewer the transactions that will need to be
     * pseudo-aborted.
     */
    StartTimer (PseudoCrashIntervalTimePeriod);
    /* Set global flag to indicate the pseudo-crash interval
     * has started. All "UNDO" records will now be written as
     * "PRE-PSEUDO-CRASH-INTERVAL-UNDO" records
     * instead.
     */
    PseudoCrashIntervalActive = TRUE;
    /* The pseudo-crash interval ends when timer expires. */
    WHEN (TimerExpires ()) DO
        /* Generate unique timestamp for the pseudo-crash
         * record */
        timeStamp = GenerateUniqueTimeStamp ();
        /* Write start pseudo-crash record */
        LogWrite ("START-PSEUDO-CRASH", timeStamp);
        /* End the pseudo-crash interval */
        PseudoCrashIntervalActive = FALSE;
        /* Perform a pseudo-abort on all active transactions
         * that started before the pseudo-crash interval.
         */
        FOR EACH ACTIVE TRANSACTION DO
            /* Check if the transaction started before the pseudo-
             * crash interval. If so, perform a pseudo-abort on
             * the transaction as in the One-Pass Recovery
             * Algorithm above
             */
            IF (transaction.lowLSN <= PreIntervalHighLSN)
                THEN Abort Transaction (transaction, DoPseudoAbort);
            END
        /* Write an END-PSEUDO-RECOVERY record */
        LogWrite ("END-PSEUDO-RECOVERY", timeStamp);
    END
END
```

TABLE 5

```
/*
 * Input to this routine is the timestamp of the most
 * recent END-PSEUDO-RECOVERY record successfully
 * written to the archive.
 */
CatastrophicMediaRecovery (MostRecentPseudoCrashTime
                            Stamp)
BEGIN
    /* Initialize transaction table to indicate no active
     * transactions.
     */
    InitializeTransactionTable ();
    /* Initialize local variable used to determine
     * if PSEUDO-RECOVERY records should be applied
     * Only the PSEUDO-RECOVERY records from the last
     * successful pseudo-crash will be applied.
     */
    ApplyPseudoCrashRecords = FALSE;
    /* Read and process each record in the archive
     * This makes one pass over the archive, starting with the
     * oldest record and reading toward the most recently
     * written record.
     */
    FOR EACH RECORD IN THE ARCHIVE DO
        SELECT (logrecord.type)
            WHEN ("START-PSEUDO-CRASH") DO
                /* Check if the timestamp on this record matches the
                 * input timestamp. If so, this is the most recent
                 * pseudo-crash and its PSEUDO-RECOVERY records
                 * should be applied.
                 */
                IF (logrecord.timestamp = MostRecentPseudoCrashTime
                    Stamp)
                    THEN ApplyPseudoCrashRecords = TRUE;
            END
            WHEN ("END-PSEUDO-CRASH") DO
                /* If this is the most recent END-PSEUDO-CRASH
                 * record then the forward pass is complete. Exit
                 * from the loop to begin the undo pass over the
                 * archive records.
                 */
                IF (logrecord.timestamp = MostRecentPseudoCrash
                    TimeStamp)
                    THEN GOTO END_RECORD_FOUND;
            END
            WHEN ("END-TRANSACTION") DO
                /* This transaction has ended. Remove it from the
                 * transaction table.
                 */
                RemoveTransactionFromTable (logrecord.transaction);
            END
            OTHERWISE DO
                /* Determine if the record should be applied to the
                 * data. If the record is a PSEUDO-RECOVERY and we
                 * are applying the PSEUDO-RECOVERY records, then
                 * apply it. Likewise if the record is not a
                 * PSEUDO-RECOVERY and we are not applying the
                 * PSEUDO-RECOVERY records, then it is applied as
                 * well. Otherwise the record is ignored.
                 */
                IF (  ((ApplyPseudoCrashRecords = TRUE)
                        AND (logrecord.type =
                            "PSEUDO-RECOVERY"))
                        OR
                       ((ApplyPseudoCrashRecords ≠TRUE)
                        AND (logrecord.type ≠"PSEUDO-
                            RECOVERY")) )
                    THEN DO
                        /* Check if this record's transaction is
                         * recorded in the transaction table. If not,
                         * add the transaction to the table.
                         */
                        IF (LocateTransactionInTable (logrecord.trans-
                            action) = NOT_FOUND)
                            THEN InsertTransactionIntoTable
                                (logrecord.transaction);
                        /* Save the LSN of the last record seen for each
                         * transaction */
                        SaveHighLsnInTable (logrecord.transaction, log
                            record.lsn);
                        /* Apply the record */
                        ApplyRecord (logrecord);
                    END
            END
        END SELECT
    END
```

TABLE 5-continued

```
    /* If the END-PSEUDO-RECOVERY record for the specified
     * timestamp was not found in the archive, return an
     * error to the caller to indicate the data was not
     * restored to a transaction-consistent state.
     */
    RETURN (FAILURE);
END_RECORD_FOUND:
    /* The END-PSEUDO-RECOVERY record was found in the
     * archive. To restore the data to a transaction-
     * consistent state we must abort all transactions that
     * were active when the START-PSEUDO-CRASH record was
     * written. These transactions are now recorded in the
     * transaction table as a result of the forward pass over
     * the archive above. To abort the transaction we need
     * to make a backward pass over the archive until all
     * records for the aborted transaction have been read and
     * their effects undone.
     */
    WHILE TRANSACTION TABLE IS NOT EMPTY DO
        /* Read the record with the highest LSN stored in the
         * transaction table
         */
        highestLSN = MaxHighLsnInTransactionTable ();
        LogReadRecord (highestLsn, &logrecord);
        /* Undo effects of this record */
        UndoRecord (logrecord);
        /* Update the highest LSN for the record's transaction.
         * If this was the first record for the transaction, the
         * transaction is removed from the transaction table.
         */
        IF (logrecord.backpointer LSN = NULL_LSN)
            THEN RemoveTransactionFromTable (logrecord.trans-
                    action);
            ELSE SaveHighLsnInTable (logrecord.transaction,
                    logrecord.backpointerLSN);
    END
    /* All transactions active at the time of the START-
     * PSEUDO-CRASH have been aborted and their effects
     * undone. No records from transactions starting after
     * the START-PSEUDO-CRASH record were applied. The
     * client's data has been restored to a transaction-
     * consistent state at the point of the START-PSEUDO-
     * CRASH record.
     */
    RETURN (SUCCESS);
END
```

TABLE 6

```
ForwardProcessing ()
BEGIN
    /* As each log extent fills, record the EXTENT-ID along
     * with the transactions that are currently active.
     */
    WHEN (CurrentExtentIsFull) DO
        /* Save the list of transactions which are currently
         * active along with the EXTENT-ID of the current
         * extent.
         */
        SaveListOfActiveTransactions (CurrentExtentId, Trans-
            actionTable);
    END
END
```

TABLE 7

```
/* Input to this routine is the EXTENT-ID of the extent to
 * be archived.
 */
Archiving ( ExtentId )
BEGIN
    /* Initialize highest record LSN copied to the archive */
    highestLSN = NULL_LSN;
    /* First, obtain the list of transaction which were active
     * when this extent became full.
     */
    ObtainListOfActiveTransactions    (ExtendId, ActiveTrans-
                                        actionList);
    /* Begin copying records from the extent to the archive.
     * Undo records may be discarded, but only if their trans-
```

TABLE 7-continued

```
     * action is not on the active transaction list.
     */
    FOR EACH RECORD IN THE EXTENT DO
        /* If the record is not an UNDO record OR
         * If the record is an UNDO and its transactions
         * appears on the active transaction list then copy it
         * to the archive.
         */
        IF ((logrecord.type != "UNDO") OR
            (LocateTransactionInList   (logrecord.transaction,
                                        ActiveTransactionList) =
                                        FOUND))
        THEN DO
            /* Save the LSN of the last record copied to the
             * archive */
            highLSN = logrecord.LSN;
            /* Copy the record to the archive */
            LogWriteArchive (logrecord);
            END
        ELSE DO
            /* This record is an UNDO record that belongs to
             * a transaction which is not on othe active
             * transaction list. The record is not needed
             * for media recovery and it is not copied to
             * the archive.
             */
            DiscardRecord (logrecord);
            END
    END
    /* All records in the extent have been read
     * If any records were copied to the archive
     * then save the LSN of the last record copied.
     */
    IF (highestLSN != NULL_LSN)
        THEN SaveHighestArchiveLSN (highestLSN);
END
```

TABLE 8

```
/*
 * Input to this routine is the LSN of the highest record in
 * the last extent to be archived.
 */
CatastrophicMediaRecovery (HighArchive LSN)
BEGIN
    /* Initialize transaction table to indicate no active
     * transactions.
     */
    InitializeTransactionTable ();
    /* Read and process each record in the archive
     * This makes one pass over the archive, starting with
     * the oldest record and reading toward the most recently
     * written record.
     */
    FOR EACH RECORD IN THE ARCHIVE DO
        /* Check if we have reached the end of the last extent
         * archived. */
        IF (logrecord.LSN > HighArchive LSN)
            THEN GOTO END_ARCHIVE_FOUND;
        /* Check if this record's transaction is recorded in the
         * transaction table. If not, add the transaction to
         * table
         */
        IF (LocateTransactionInTable (logrecord.transaction) =
            NOT_FOUND)
            THEN InsertTransactionIntoTable    (logrecord.trans-
                                                action);
        /* Save the LSN of the last record seen for each trans-
         * action */
        SaveHighLsnInTable     (logrecord.transaction,
                                logrecord.lsn);
        SELECT (logrecord.type)
            WHEN ("END_TRANSACTION") DO
                /* This transaction has ended. Remove it from the
                 * transaction table.
                 */
                RemoveTransactionFromTable (logrecord.transaction);
            END
            OTHERWISE DO
                /* Apply all other records. */
                ApplyRecord (logrecord)
            END
```

TABLE 8-continued

```
    END SELECT
END
/* If the highest record was not found in the archive,
 * return an error to the caller to indicate the data was
 * not restored to a transaction-consistent state.
 */
RETURN (FAILURE);
END_ARCHIVE_FOUND:
/* The highest record was found in the archive.
 * To restore the data to a transaction-consistent state
 * we must abort all transactions that were active at the
 * end of original log extent. These transactions are now
 * recorded in the transaction table as a result of the
 * forward pass over the archive above. To abort the
 * transaction we need to make a backward pass over the
 * archive until all records for the aborted transaction
 * have been read and their effects undone.
 */
WHILE TRANSACTION TABLE IS NOT EMPTY DO
    /* Read the record with the highest LSN stored in the
     * transaction table.
     */
    highestLSN = MaxHighLsnInTransactionTable ();
    LogReadRecord (highestLsn, &logrecord);
    /* Undo effects of this record */
    UndoRecord (logrecord);
    /* Update the highest LSN for this record's transaction.
     * If this was the first record for the transaction, the
     * transaction is removed from the transaction table.
     */
    IF (logrecord.backpointerLSN = NULL_LSN)
        THEN   RemoveTransactionFromTable (logrecord.trans-
               action);
        ELSE   SaveHighLsnInTable (logrecord.transaction,
               logrecord.backpointerLSN);
END
/* All transactions active at the end of the original
 * extent have been aborted and their effects undone. The
 * client's data has been restored to a transaction-
 * consistent state.
 */
RETURN (SUCCESS);
END
```

We claim:

1. In a transaction-based data processing system having a stable storage resource for storing transaction log records and a first recovery procedure means for database recovery from system failure, said first recovery procedure means including means for executing in a single pass a sequence of recovery log records stored in said stable storage resource as selectable record types including REDO and UNDO types, said system including an archival storage resource for receiving and storing dumps of the contents of said stable storage resource, a method for transaction-consistent resource recovery from failure of said stable storage resource, said method comprising the steps of:

during forward processing of said transactions, performing in sequence the steps of writing transaction log records to a recovery log, writing to said recovery log a START-PSEUDO-CRASH type record having a pseudo-crash timestamp value corresponding to a predetermined pseudo-crash time during said forward processing, writing to said recovery log a series of PSEUDO-RECOVERY type records in accordance with said first recovery procedure means for recovering from a system failure occurring at said predetermined pseudo-crash time, writing to said recovery log an END-PSEUDO-RECOVERY type record having said pseudo-crash timestamp value, and writing to said stable storage resource a recovery log copy of all existing recovery log records not already stored in said stable storage resource at completion of said END-PSEUDO-RECOVERY record writing step; during an archival dump of said recovery log copy from said stable storage resource to said archival storage resource, filtering said recovery log copy records by discarding from one to all UNDO type records while writing all remaining record types to said archival storage resource as filtered recovery log archive records, and writing to said archival storage resource a MOST-RECENT-PSEUDO-CRASH record having said predetermined pseudo-crash timestamp value in response to writing an END-PSEUDO-RECOVERY record to said archival storage;

executing said filtered recovery log archive records in accordance with said first recovery procedure means during a single forward pass while ignoring all said PSEUDO-RECOVERY type log archive records associated with any said pseudo-crash timestamp different from the pseudo-crash timestamp contained in said MOST-RECENT-PSEUDO-CRASH record; and executing said PSEUDO-RECOVERY type log archive records associated with said MOST-RECENT-PSEUDO-CRASH timestamp in accordance with said first recovery procedure means while ignoring all said REDO and UNDO type log archive records made subsequently to the START-PSEUDO-CRASH type log archive record having a timestamp equal to said MOST-RECENT-PSEUDO-CRASH timestamp value.

2. In a transaction-based data processing system having a stable storage resource for storing transaction log records and a first recovery procedure means for database recovery from system failure, said first recovery procedure means including means for executing in a single pass a sequence of recovery log records stored in said stable storage resource as selectable record types including REDO and UNDO types, said system including an archival storage resource for receiving and storing dumps of the contents of said stable storage resource, a method for transaction-consistent resource recovery from failure of said stable storage resource, said method comprising the steps of:

during forward processing of said transactions, performing in sequence the steps of writing transaction log records to a recovery log, writing to said recovery log all UNDO type recovery log records created by said first recovery procedure means as log records having a PRE-PSEUDO-CRASH-INTERVAL-UNDO type during a time interval beginning at a predetermined time during said forward processing, writing to said recovery log a START-PSEUDO-CRASH type record having a pseudo-crash timestamp value corresponding to the time at the end of said time interval, writing to said recovery log a series of PSEUDO-RECOVERY type records in accordance with said first recovery procedure means for recovering from a system failure at the end of said time interval, writing to said recovery log and END-PSEUDO-RECOVERY type record having said pseudo-crash timestamp value, and writing to said stable storage resource a recovery log copy of all existing recovery log records not already stored in said stable storage resource at completion of said END-PSEUDO-RECOVERY record writing step;

during an archival dump of said recovery log copy from said stable storage resource to said archival storage resource, filtering said recovery log copy records by discarding from one to all UNDO type records while writing all remaining record types to said archival storage resource as filtered recovery log archive records, and writing to said stable storage resource a MOST-RECENT-PSEUDO-CRASH record having said pseudo-crash timestamp value in response to writing an END-PSEUDO-RECOVERY record to said archival storage;

executing said filtered recovery log archive records in accordance with said first recovery procedure means during a single forward pass while ignoring all said PSEUDO-RECOVERY type log archive records associated with any said pseudo-crash timestamp different from the pseudo-crash timestamp contained in said MOST-RECENT-PSEUDO-CRASH record;

executing said PSEUDO-RECOVERY type log archive records associated with said MOST-RECENT-PSEUDO-CRASH timestamp in accordance with said first recovery procedure means while ignoring all said REDO and UNDO type log archive records made subsequently to the START-PSEUDO-CRASH type log archive record having a timestamp equal to said MOST-RECENT-PSEUDO-CRASH timestamp value; and executing said PRE-PSEUDO-CRASH-INTERVAL-UNDO type log archive records in the pseudo-crash interval associated with said MOST-RECENT-PSEUDO-CRASH timestamp value in accordance with said first recovery procedure means during a single reverse pass over said most recent recovery log archive pseudo-crash interval.

3. In a transaction-based data processing system having a stable storage resource for storing transaction log records in blocks denominated "log extents" and a first recovery procedure means for database recovery from system failure, said first recovery procedure means including means for executing in a single pass a sequence of recovery log records stored in said stable storage resource as selectable record types including REDO and UNDO types, said system including an archival storage resource for receiving and storing dumps of the contents of said stable storage resource, a method for transaction-consistent resource recovery from failure of said stable resource, said method comprising the steps of:

during forward processing of said transactions, performing in sequence the steps of writing transaction log records to a recovery log, writing to said stable storage resource a recovery log copy of all said recovery log records within a first said log extent not already stored in said stable storage resource at completion of the writing of said first log extent to said recovery log, and writing to said stable storage resource an EXTENT-ID type record having a list of all transactions still active at the completion of the writing of said first log extent to said recovery log;

during an archival dump of said recovery log copy from said stable storage resource to said archival storage resource, filtering said recovery log copy records by discarding from one to all UNDO type records except for such UNDO type records involving transactions in said active transaction list while writing all remaining record types to said archival storage resource as filtered recovery log archive records;

executing said filtered recovery log archive records in accordance with said first recovery procedure means in a single forward pass while ignoring all log archive records following the most recent EXTENT-ID type log archive record; and executing said UNDO type log archive records during a single reverse pass over the most recent said log extent in said recovery log archive.

4. A method, implemented on a digital computer system, for generating in an archival storage resource a filtered recovery log archive having recovery log records of selectable types including UNDO and REDO types generated and written to a recovery log by a first recovery procedure means for resource recovery from system failure, said filtered recovery log archive being for the transaction-consistent resource recovery from a stable storage resource failure in a transaction-based data processing system, said method comprising the steps of:

writing to said recovery log a START-PSEUDO-CRASH type record having a pseudo-crash timestamp value corresponding to a predetermined pseudo-crash time during the operation of said data processing system;

writing to said recovery log series of PSEUDO-RECOVERY type records in accordance with said first recovery procedure means for recovering from a system failure occurring as said predetermined pseudo-crash time;

writing to said recovery log an END-PSEUDO-RECOVERY type record having said pseudo-crash timestamp value;

writing to said stable storage resource a recovery log copy of all existing recovery log records not already stored in said stable storage resource at completion of said END-PSEUDO-RECOVERY writing step; and writing said recovery log copy from said stable storage resource to said archival storage resource except for one or more UNDO type recovery log copy records.

5. The method of claim 4 wherein said first writing step further comprises the step of:

relabeling all said UNDO type records as PRE-PSEUDO-CRASH-INTERVAL-UNDO type records during a time interval preceding said predetermined pseudo-crash time.

6. A method, implemented on a digital computer system, for generating in an archival storage resource a filtered recovery log archive having recovery records organized in blocks denominated "log extents", said recovery records being of selectable types including UNDO and REDO types generated by a first procedure means for resource recovery from system failure, said filtered recovery log archive being for the transaction-consistent resource recovery from a stable storage resource failure in a transaction-based data processing system, said method comprising the steps of:

writing to a recovery log a series of recovery records including REDO and UNDO type records in accordance with said first recovery procedure means until all said recovery records in a first said log extent are written to said recovery log;

writing to said recovery log a list of transactions still active when said first log extent is completely written to said recovery log; and     filtering said recovery log records by discarding from one to all UNDO records not associated with transactions in said active transaction list while writing said recovery log records to said archival storage resource.

7. A computer system for concurrently executing failure-independent processes having a recovery log containing a plurality of recovery records of different types, including UNDO and REDO types, said system comprising:

first storage resource means for storing a data resource;

stable storage resource means for storing data including said recovery log having UNDO and REDO types of said recovery records;

first recovery procedure means for generating said recovery records in accordance with a first recovery procedure to recover a transaction-consistent version of said data resource after a system failure;

archival storage resource means for storing a data image dump archive of said data resource and a recovery log archive of said recovery log records;

pseudo-crash control means for creating a pseudo-crash signal that causes said first recovery means to create a series of pseudo-crash recovery records and for writing said pseudo-crash recovery records to said recovery log;

archival log filter means for excluding from said recovery log archive from one to all said UNDO type recovery log records except for those generated by said pseudo-crash control means; and     recovery execution means for modifying said data image dump archive in accordance with said first recovery procedure using said recovery log archive records whereby said data image dump archive is brought into a transaction-consistent state.

8. A computer system of claim 7 further comprising:

pseudo-crash interval marking means for marking all said UNDO type recovery log records created during a predetermined pseudo-crash interval preceding said pseudo-crash signal as PRE-PSEUDO-CRASH-INTERVAL-UNDO type records, thereby preventing their exclusion from said recovery log archive dump by said archival log filter means.

9. A computer system for concurrently executing failure-independent processes having a recovery log containing a plurality of recovery records of different types, including UNDO and REDO types, said system comprising:

first storage resource means for storing a data resource;

stable storage resource means for storing data including said recovery log having UNDO and REDO types of said recovery records and being organized in blocks denominated "log extents";

first recovery procedure means for generating said recovery records in accordance with a first recovery procedure to recover a transaction-consistent version of said data resource after a system failure;

archival storage resource means for storing a data image dump archive of said data resource and a recovery log archive of said recovery log records;

extent closure means for writing a list of transactions still active when all said recovery records in a first said log extent are written to said recovery log;

archival log filter means for excluding all UNDO type recovery log records from said recovery log archive except for those related to transactions on said active transaction list; and     recovery execution means for applying said recovery log archive records to said data image dump archive in accordance with said first recovery procedure whereby said data image dump archive is brought into a transaction-consistent state.

\* \* \* \* \*

UNITED STATES PATENT AND TRADEMARK OFFICE
CERTIFICATE OF CORRECTION

PATENT NO. : 5,278,982
DATED : January 11, 1994
INVENTOR(S) : Daniels et al

It is certified that error appears in the above-indentified patent and that said Letters Patent is hereby corrected as shown below:

Please insert the following on the Title page after
[58] Field of Search, please add "[56]  References Cited
       U.S. PATENT DOCUMENTS

| | | | |
|---|---|---|---|
| 4,507,751 | 3/1985 | Gawlick, et al | 364/900 |
| 4,648,031 | 3/1987 | Jenner | 364/200 |
| 4,814,971 | 3/1989 | Thatte | 364/200 |
| 4,868,744 | 9/1989 | Reinsch et al | 364/280 |
| 4,878,167 | 10/1989 | Kapulka et al | 364/200 |
| 4,945,474 | 7/1990 | Elliott et al | 364/200 |

OTHER PUBLICATIONS
C. Mohan, et al "ARIES: A Transaction Recovery Method Supporting Fine-Granularity Locking and Partial Rollbacks Using Write-Ahead Logging", IBM Research Division, Yorktown Heigths, New York (IBM Research Report RJ 6649, Revised 11/2/90)

Signed and Sealed this

Twenty-first Day of March, 1995

Attest:

BRUCE LEHMAN

*Attesting Officer*          *Commissioner of Patents and Trademarks*